(12) United States Patent
Kirtzakis et al.

(10) Patent No.: US 10,023,236 B2
(45) Date of Patent: Jul. 17, 2018

(54) COLUMN FOR A MOTOR VEHICLE BODY SHELL STRUCTURE, METHOD FOR THE PRODUCTION OF A COLUMN AND MOTOR VEHICLE BODY SHELL STRUCTURE

(71) Applicant: Daimler AG, Stuttgart (DE)

(72) Inventors: Stylianos Kirtzakis, Stuttgart (DE); Michael Bendiks, Plochingen (DE); Florian Spitzmueller, Boeblingen (DE); Manfred Kempf, Vogt (DE); Juergen Thalemann, Steinhelm (DE)

(73) Assignee: Daimler AG, Stuttgart (DE)

( * ) Notice: Subject to any disclaimer, the term of this patent is extended or adjusted under 35 U.S.C. 154(b) by 72 days.

(21) Appl. No.: 14/889,757

(22) PCT Filed: Apr. 15, 2014

(86) PCT No.: PCT/EP2014/001018
§ 371 (c)(1),
(2) Date: Mar. 8, 2016

(87) PCT Pub. No.: WO2014/180532
PCT Pub. Date: Nov. 13, 2014

(65) Prior Publication Data
US 2016/0264182 A1    Sep. 15, 2016

(30) Foreign Application Priority Data

May 7, 2013 (DE) .................. 10 2013 007 805

(51) Int. Cl.
*B62D 25/04* (2006.01)
*B62D 29/00* (2006.01)
*B62D 29/04* (2006.01)

(52) U.S. Cl.
CPC .......... *B62D 25/04* (2013.01); *B62D 29/004* (2013.01); *B62D 29/007* (2013.01); *B62D 29/008* (2013.01); *B62D 29/046* (2013.01)

(58) Field of Classification Search
CPC ...... B62D 25/02; B62D 25/025; B62D 25/04; B62D 29/00; B62D 29/007; B62D 29/008; B62D 29/046

(Continued)

(56) References Cited

U.S. PATENT DOCUMENTS

| 6,474,726 B1 * | 11/2002 | Hanakawa | ........... B62D 29/002 296/187.12 |
| 6,607,239 B1 * | 8/2003 | Fuji | ........................ B60R 22/24 296/203.03 |

(Continued)

FOREIGN PATENT DOCUMENTS

| CN | 1414916 A | 4/2003 |
| CN | 202038371 U | 11/2011 |

(Continued)

OTHER PUBLICATIONS

PCT/EP2014/001018, International Search Report (PCT-ISA/220 and PCT/ISA/210) dated Jun. 30, 2014, with partial English translation, enclosing Written Opinion of the International Searching Authority (PCT/ISA/237) (13 pages).

(Continued)

*Primary Examiner* — Gregory A Blankenship
(74) *Attorney, Agent, or Firm* — Crowell & Moring LLP

(57) ABSTRACT

A column for a motor vehicle body shell structure and a method for producing the same is disclosed. The column includes a column body which has a first material in a first region and a second material in a second region, where the second region is a reinforcement region. The first region is produced by forging and the reinforcement region is formed (Continued)

by a reinforcement insert and/or a reinforcement core and is forged into, reforged in, forged to, or formed on the first region.

13 Claims, 2 Drawing Sheets

(58) Field of Classification Search
USPC ..... 296/193.05, 193.06, 203.01, 203.03, 205
See application file for complete search history.

(56) References Cited

U.S. PATENT DOCUMENTS

| | | | | |
|---|---|---|---|---|
| 6,988,763 | B2* | 1/2006 | Saeki | B62D 21/157 |
| | | | | 296/187.03 |
| 7,735,906 | B2* | 6/2010 | Takahashi | B62D 25/04 |
| | | | | 296/187.02 |
| 7,959,217 | B2* | 6/2011 | Onuma | B62D 25/04 |
| | | | | 296/146.11 |
| 8,020,924 | B2* | 9/2011 | Niezur | B62D 29/002 |
| | | | | 296/187.02 |
| 8,322,781 | B2* | 12/2012 | Angenheister | B62D 25/145 |
| | | | | 296/187.12 |
| 9,580,111 | B1* | 2/2017 | Caliskan | B62D 29/043 |
| 2002/0089215 | A1* | 7/2002 | Frasher | B60R 21/04 |
| | | | | 296/203.02 |
| 2010/0098969 | A1* | 4/2010 | Hashimura | B21J 15/025 |
| | | | | 428/653 |
| 2013/0052392 | A1* | 2/2013 | Radlmayr | B29C 70/688 |
| | | | | 428/68 |
| 2013/0106138 | A1* | 5/2013 | Brockhoff | B29C 70/028 |
| | | | | 296/187.03 |
| 2013/0313862 | A1* | 11/2013 | Yamaji | B62D 25/025 |
| | | | | 296/203.01 |
| 2014/0084633 | A1* | 3/2014 | Matsuda | B62D 25/02 |
| | | | | 296/203.01 |
| 2014/0145469 | A1* | 5/2014 | Mildner | B62D 29/005 |
| | | | | 296/193.06 |
| 2015/0251708 | A1* | 9/2015 | Kim | B62D 25/04 |
| | | | | 296/203.01 |
| 2016/0194036 | A1* | 7/2016 | Kurokawa | B62D 29/005 |
| | | | | 296/203.01 |
| 2016/0264182 | A1* | 9/2016 | Kirtzakis | B62D 25/04 |
| 2016/0356334 | A1* | 12/2016 | Onoue | B62D 29/04 |
| 2017/0073017 | A1* | 3/2017 | Steffens | B62D 25/04 |

FOREIGN PATENT DOCUMENTS

| | | |
|---|---|---|
| CN | 202863563 U | 4/2013 |
| DE | 10 2009 041 703 A1 | 4/2010 |
| DE | 10 2009 022 486 A1 | 12/2010 |
| DE | 10 2009 036 324 A1 | 2/2011 |
| DE | 10 2010 051 785 A1 | 7/2011 |
| FR | 2 959 981 A1 | 11/2011 |
| WO | WO 2013/008515 A1 | 1/2013 |

OTHER PUBLICATIONS

Chinese Office Action issued in Chinese counterpart application No. 201480025816.8 dated Dec. 20, 2016, with partial English translation (Nine (9) pages).

Chinese Office Action issued in Chinese counterpart application No. 201480025816.8 dated Jul. 28, 2017, with partial English translation (Nine (9) pages).

Chinese Office Action issued in Chinese counterpart application No. 201480025816.8 dated Feb. 14, 2018, with partial English translation (Eleven (11) pages).

* cited by examiner

COLUMN FOR A MOTOR VEHICLE BODY SHELL STRUCTURE, METHOD FOR THE PRODUCTION OF A COLUMN AND MOTOR VEHICLE BODY SHELL STRUCTURE

BACKGROUND AND SUMMARY OF THE INVENTION

The invention relates to a column for a motor vehicle body shell structure as well as a motor vehicle body shell structure.

Columns and methods for the production of columns of the type discussed here are known. A known column made from steel in monocoque construction has several components which in particular must be joined to one another in a complex manner from different high-strength, solid and/or ductile steel sheets. Columns are also known which have a column body which is formed at least in regions as a casting, for example as a light metal casting. Columns are also known, the column body of which is formed from high strength sheet metal by hydroforming. Finally, according to non-prepublished prior art, a central column is known which has a column body which is produced by massive forming, in particular by forging. The known solutions are worthy of improvement, in particular with regard to their material properties and with regard to their connection to adjacent parts of a motor vehicle body shell structure.

Therefore, the object of the invention is to create a column for a motor vehicle body shell structure as well as a method for the production of such a column, wherein the disadvantages referred to do not occur. In particular the column is to have improved material properties as well as an improved attachment capability to adjacent elements of a motor vehicle body shell structure. The object of the invention is also to create a motor vehicle body shell structure having a corresponding column.

For the solution of this object, a column for a motor vehicle body shell structure is proposed. This has a column body which comprises a first material, at least in a first region. The column body is produced by massive forming, at least in the first region. The column is distinguished by at least one second region of the column body comprising a second material which is different from the first material. In this way, a column having a hybrid column body is created, whereby the material properties of the column can be coordinated according to need and in particular can be optimized with regard to a design for an accident. In particular, the tensile strength, yield strength, elongation at break and/or ductility of the column can be designed according to requirement and also locally according to requirement due to the hybrid construction method.

Due to the fact that at least the first region of the column is formed by massive forming, at least this region has a highly-compacted structure which is completely free of cavities. An increased mechanical stability hereby results and a reduced effort during the component testing in comparison to castings. During massive forming, additionally it is readily possible to design a cross-section of the column body locally according to load, wherein at least the first region of the central column can have a varying cross-sectional size and/or cross-sectional shape. It is in particular possible to design the cross-section of the column body locally according to load such that mechanically high-loaded regions have a greater wall thickness than mechanically lower loaded regions. Therefore it is not necessary to design all regions of the column to a wall thickness necessary in a mechanically high-loaded region. Rather, a design of the wall thickness according to need is possible. It is also possible to design a fiber structure of the structure during massive forming, at least in the first region, such that a fiber course is targetedly aligned in mechanically high-loaded regions, whereby these obtain particularly high mechanical stability and strength. In particular, the fiber course in mechanically high-loaded regions can be formed differently from the fiber course in mechanically lower loaded regions. During massive forming, an optimum force flow in the welded component is therefore able to be set. Due to the higher strength and stability of the massive-formed, it is overall possible to reduce the wall thickness of the column body such that the mechanically highest loaded region can also be formed with a thinner wall thickness than is, for example, possible for a casting. Wall thicknesses in mechanically lower loaded regions can be further reduced. Overall, considerable weight savings and a slimmer design of the column are therefore possible. Hereby, a viewing angle in the region of the column for a motorist is also able to be enlarged because the column is constructed to be slimmer overall. There is also more space available to get in, in particular if the column is used for the body shell structure of four-seater vehicles. In this case, in particular, more space is available in order to achieve rear space of the motor vehicle.

For massive-formed components, a lower reworking effort results which saves production costs.

The column according to the invention is additionally distinguished by the at least one second region being formed as a reinforcement region which is formed as a reinforcement insert and/or as a reinforcement core. Preferably, the at least one second region is coordinated with regard to its shape and/or its arrangement in or on the column body to the required component properties and/or the expected mechanical loading of the column.

A preferred embodiment of the column comprises more than one first region which is produced by massive forming. The different first regions can each comprise the same first material or can consist of this. Alternatively it is possible that the different first regions comprise different materials or consist of different materials.

Alternatively or additionally it is preferably possible that the column comprises more than one second region. Therein it is also possible that the different second regions comprise the same second material. Alternatively it is possible that the second regions each comprise different second materials which are different from the first material of the at least one first region.

A column is preferred which is distinguished by the first material comprising a light metal or a light metal alloy, preferably consisting of a light metal or a light metal alloy. Preferably, the first material comprises aluminum or an aluminum alloy, or it consists of aluminum or an aluminum alloy. Alternatively or additionally, the first material preferably comprises magnesium or a magnesium alloy, or it consists of magnesium or a magnesium alloy. A further weight reduction is possible due to the selection of a light metal or a light metal alloy for the first material. This takes the concept of lightweight construction into consideration. In particular then if the correspondingly selected first material is present in a connection region of the column to adjacent elements of the motor vehicle body shell structure, wherein the adjacent elements also comprise a light metal or a light metal alloy, joining the column to the adjacent elements is clearly facilitated in comparison to a material combination of steel/light metal. As the same or at least similar materials are in fact joined to each other here, standard joining methods can be used, which is not possible for a material pairing of steel/light metal, in particular steel/aluminum. In particular, a material pairing of a 7000 aluminum alloy with a 6000 aluminum alloy can be provided. For this purpose, the first material preferably consists of a 7000 aluminum alloy or a 6000 aluminum alloy.

Due to the selection of a light metal or a light metal alloy for the first material, a hydrogen embrittlement is also prevented which otherwise occurs for high-strength steels which have been used until now in particular for B-columns.

A column is also preferred which is distinguished by the second material comprising steel, in particular high-strength steel, or consisting of steel, in particular high-strength steel. Alternatively or additionally it is possible that the second material comprises a light metal or a light metal alloy or consists of a light metal or a light metal alloy. In particular it is possible that the second material comprises aluminum or an aluminum alloy, preferably EN-AW-7075, or consists of aluminum or an aluminum alloy, preferably EN-AW-7075. Alternatively or additionally it is possible that the second material comprises magnesium or a magnesium alloy or consists of magnesium or a magnesium alloy. Alternatively or additionally it is possible that the second material comprises fiber-reinforced plastic or consists of fiber-reinforced plastic. In particular the selection of a light metal or a light metal alloy or a fiber-reinforced plastic for the second material enables a further weight reduction for the column.

Preferably, the second material has a higher strength than the first material. In this case, the column body is already reinforced in the second region due to the material properties of the second material. For example it is possible that a column having a column body which substantially comprises a light metal has an integrated steel core, in particular made from high-strength steel, or preferably a core made from a high-strength aluminum alloy, for example EN-AW-7075, wherein the core is preferably forged into the light metal, is reforged from the light metal or is forged to or formed on the light metal. It is also preferably possible that the column body comprises at least one stiffening insert made from fiber reinforced plastic. The fiber-reinforced plastic preferably has glass fibers, aramid fibers, basalt fibers, carbon fibers, in particular insulated carbon fibers, and/or steel fibers.

Alternatively a column is preferred which is distinguished by the second region being formed as a functional region. The column produced in hybrid construction can also preferably comprise an integrated functional element, for example a receiver or a connection or reinforcement position for a belt retractor, a belt attachment, an airbag attachment and/or a motor for a window regulator. It is also possible that the column comprises, as a second region, a reinforcement for a lock, a reinforcement for a door hinge, an attachment pin, a threaded bushing, an insert, in particular a threaded insert, and/or a part of the door hinge itself, preferably a base plate or a column part. If the second region is formed as a functional region, this can be integrated into the column in an unconstrained manner. Therefore separate individual parts are avoided and joining steps are omitted as well as tools and devices provided for these. Production costs, in particular logistical costs, can hereby be saved.

A column is also preferred which is distinguished by being formed as an A-column, a B-column or a C-column. The column is preferably formed as a long column or as a short column, in particular depending on whether it is provided for the motor vehicle body shell structure of a vehicle having a fixed vehicle roof, in particular a limousine, or for a motor vehicle having a variable roof, in particular a soft-top convertible or a motor vehicle having a retractable hard top. In particular increased mechanical requirements are specified for a short column such that here the improved construction properties of the column have a particularly favorable effect.

Finally, a column is preferred which is distinguished by at least one connection node to connect the column body to a motor vehicle body shell structure being formed in one piece with the column body. Here, in particular in the case of a short column, preferably only one connection node is provided in the lower region of the column, with which this is preferably joined to a side member or a sill and/or to a cross member of the motor vehicle body shell structure. A long column preferably has two connection nodes to connect to a roof frame and a lower side member and/or cross member. The at least one connection node is preferably formed on the column body during massive forming or forged to the column body. Hereby a functional integration is achieved, wherein components are virtually substituted which are otherwise provided separately and are joined to one another.

Therefore, overall for a motor vehicle body shell structure in which the column is used, a reduced parts count results which enables cost savings in logistics and in the production process. In particular joining steps are omitted which would otherwise be necessary in order to join the column body to the at least one connection node. As, in particular, a soldering or welding which is otherwise typical is omitted in this region, thermal distortion is also prevented, whereby a dimensional tolerance and a structure of the column survive in the region of the connection node. In the same manner, join tolerances are omitted which would be present for a two-piece formation of the column body and the connection node. The overall construction of the motor vehicle body shell structure is therefore particularly dimensionally tolerant.

The at least one connection node is preferably formed in such a way that it can be joined to the motor vehicle body shell structure in a simple manner by means of mechanical joining techniques, preferably by screwing and/or riveting. For this purpose, it preferably has fastening means such as bore holes or even a thread, wherein in particular bore holes can be preferably produced during massive forming or forging. In particular during die forging it is possible to introduce recesses and/or bore holes into the column body to be formed with the aid of a correspondingly formed forging die. Of course in one exemplary embodiment of the column it is also possible to integrate the at least one connection node into the motor vehicle body shell structure by means of other joining techniques such as, preferably, soldering, welding or gluing.

A method for producing a column with at least one first region of the column body is produced from a first material by massive forming. The method is distinguished by at least one second region of the column body being produced from a second material which is different from the first material. In this way, a hybrid column is created, whereby the advantages result which have already been explained in connection with the column.

A method is preferred which is distinguished by the first region and the second region being connected to each other in a non-positive, firm and/or positive manner. Preferably the second region is forged into the first region. Alternatively or additionally, the second region is forged to the first region. Alternatively or additionally, the second region is reforged with the first region. Here, forging into refers to the second region being completely surrounded by the material of the first region. Forging to refers to the second region being joined to the first region by forging, wherein, for example, the second region can have bore holes, through which material of the first region is pushed from a first side, wherein the material engages behind the second region on a second side such that finally a firm and non positive connection is caused. Reforging refers to the material of the first region encompassing the second region in regions due to the forging. Alternatively it is possible that the second region is joined to the first region in another way, preferably is screwed, riveted, glued, soldered, clinched or welded to this. However, a method is particularly preferred in which the first and the second region are produced together in a hybrid forging method.

A method is preferred in which at least the first region of the column is produced by hot forging. Herein, higher degrees of reforging are able to be achieved. An embodiment of the method is also preferred in which at least the first region of the column is produced by warm forging. Herein, lower degrees of reforming are able to be represented than during hot forging. Finally, a method is preferred in which at least the first region of the column body is produced by cold forging. The selection of a reforming temperature is directed, for the hybrid column which comprises at least two materials, towards the material which has the lowest melting temperature. In the case of a light metal, in particular in the case of aluminum or magnesium or aluminum or magnesium alloys, this lies approximately at 650° C. It is shown that at a temperature of this degree, an inclination for corrosion of steel is distinguished to be very low.

A method is also preferred which is distinguished by the column undergoing a heat treatment during and/or after massive forming. Particularly preferably, the column undergoes a heat treatment during and/or after hot forging. Preferably, the column undergoes local heat treatment. With the aid of a local or partial heat treatment, it is possible to generate corresponding local property profiles in the column, wherein preferably, on the one hand, ductile regions, and on the other hand high-strength regions, can be formed.

The description of the column on the one hand and the method on the other hand can be understood as complementary to each other. In particular a method is preferred which is distinguished by at least one method step which is caused by at least one feature, preferably combinations thereof, of an exemplary embodiment of the column. Conversely, an exemplary embodiment of the column is preferred which is characterized by at least one feature which is caused by at least one method step, preferably combinations thereof, of an exemplary embodiment of the method. All method steps described in connection to the column are preferably steps of a preferred embodiment of the method, alone or in combination with one another. All features described in connection with the method are preferably features of a preferred exemplary embodiment of the column, alone or in combination with one another For the solution of the object, a motor vehicle body shell structure is finally also proposed. This is distinguished by a column according to one of the previously described exemplary embodiments. Alternatively, the motor vehicle body shell structure is distinguished by a column which is produced with the aid of a method according to one of the previously described exemplary embodiments. In this respect, the advantages which have already been described in connection with the column and the method result with regard to the motor vehicle body shell structure.

The invention is explained in more detail below by means of the drawings.

DETAILED DESCRIPTION OF THE DRAWINGS

Figure 1:
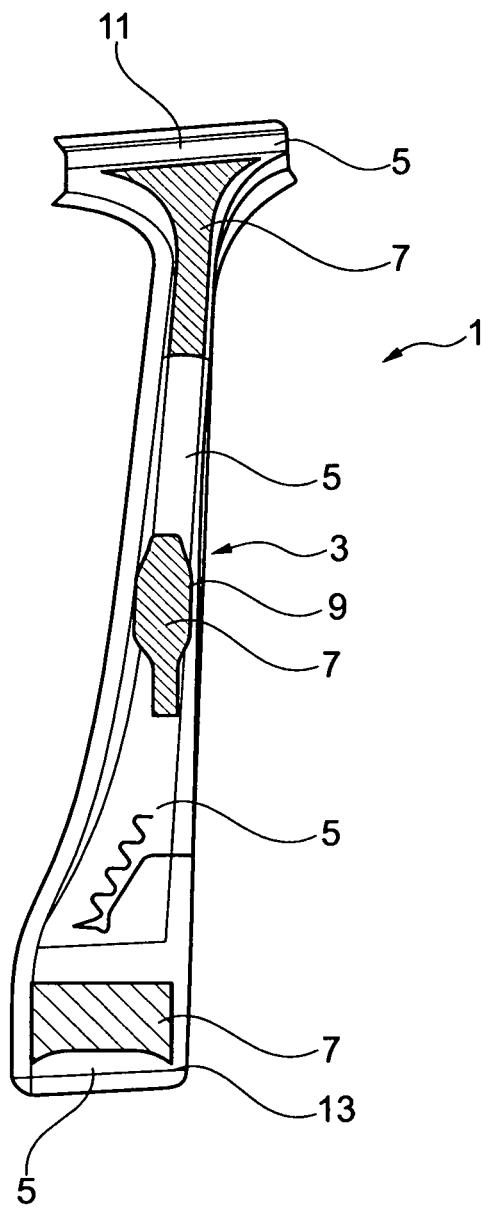
FIG. 1 is a schematic depiction of an exemplary embodiment of a column formed as a long column.

FIG. 1 shows a schematic depiction of column 1 which is formed as a long column. This has a column body 3 which comprises a first material, for example a light metal or a light metal alloy in a first region 5, wherein the column body 3 is produced in the first region 5 by massive forming. The column body 1 here comprises three second regions 7 which comprise a second material which is different from the first material. The second regions 7 are preferably formed as stiffening inserts, for example made from high-strength steel, a high-strength light metal alloy, in particular a high-strength aluminum alloy, or from fiber-reinforced plastic. The second region 7 which is central in FIG. 1 is here formed as a functional region 9, wherein it is formed in particular as a door hinge region.

The depicted embodiment of the column 1 is formed as a B-column. It comprises an upper connection node 11 which is formed in one piece with the column body 3, in particular formed on this during massive forming or formed from the material of the first region 5 and which is provided for the connection of the column 1 to a roof frame of a motor vehicle body shell structure.

The column 1 furthermore has a lower connection node 13 likewise formed in one piece with the column body 3, for the connection of the column body 3 to a side member and/or a cross member in the base region of the motor vehicle body shell structure. The lower connection node 13 is also preferably formed from the material of the first region 5 or formed on this during massive forming, particularly forging.

Figure 2:
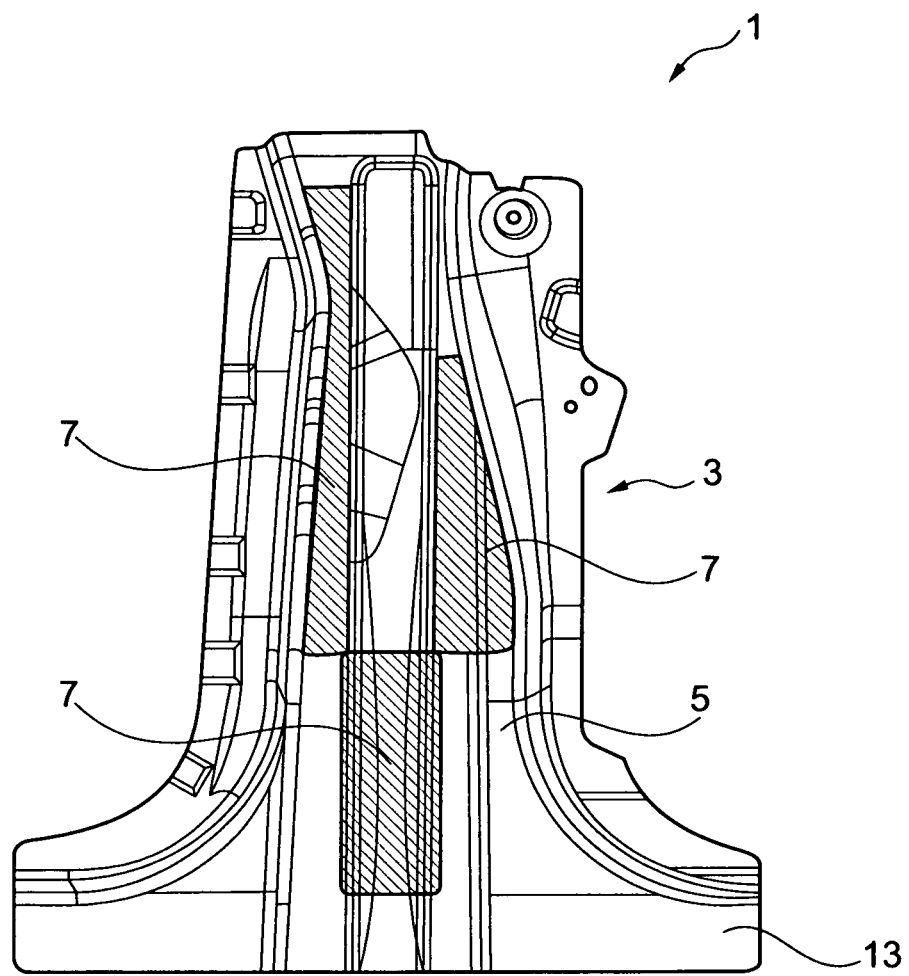
FIG. 2 is a schematic depiction of an exemplary embodiment of a column formed as a short column.

FIG. 2 shows an exemplary embodiment of the column 1 which is formed as a short column. Identical and functionally identical elements are provided with the same reference numerals such that, in this way, the previous description is referred to. This exemplary embodiment of the column 1 is also preferably formed as a B-column. However, it only has the lower connection node 13 because no connection to a roof frame is provided which the motor vehicle body shell structure does not comprise in the case of the motor vehicle for which the exemplary embodiment of column 1 is provided.

The second regions 7 are also formed, in this exemplary embodiment, preferably as reinforcement regions and/or functional regions, wherein they preferably comprise steel, a high-strength aluminum alloy or fiber-reinforced plastic as a second material.

Overall it is shown that the column proposed here or a column produced with the aid of the method proposed here has particularly favorable, optimized component properties, wherein it is able to be produced at the same time simply and cost-effectively and is likewise able to be connected to adjacent elements of a motor vehicle body shell structure simply and cost-effectively. Correspondingly, particularly favorable properties also result for a motor vehicle body shell structure which has at least one such column.

The invention claimed is:

1. A column for a motor vehicle body shell structure, comprising:
   a column body which includes a first material in a first region and a second material in a second region, wherein the second material is different from the first material and wherein the second region is a reinforcement region;
   wherein the first region is produced by forging and the reinforcement region is a reinforcement insert and/or a reinforcement core and is forged into, reforged in, or forged to the first region.

2. The column according to claim 1, wherein the first material is a light metal or a light metal alloy.

3. The column according to claim 1, wherein the second material is steel, a light metal or a light metal alloy or a fiber-reinforced plastic.

4. The column according to claim 1, further comprising an additional second region wherein the additional second region is a functional region.

5. The column according to claim 1, wherein the column is an A-column, a B-column, or a C-column.

6. The column according to claim 1, wherein a connection node is formed in one piece with the column body and wherein the column body is connectable to a motor vehicle body shell structure by the connection node.

7. A motor vehicle body shell structure comprising a column according to claim 1.

8. A method for producing a column for a motor vehicle body shell structure, wherein a column body includes a first material in a first region and a second material in a second region, wherein the second material is different from the first material, and wherein the second region is a reinforcement region, comprising the steps of:
   producing the first region by forging and forming the reinforcement region by a reinforcement insert and/or a reinforcement core and wherein the reinforcement region is forged into, reforged in, or forged to the first region.

9. The method according to claim 8, wherein the first material is a light metal or a light metal alloy.

10. The method according to claim 8, wherein the second material is steel, a light metal or a light metal alloy or a fiber-reinforced plastic.

11. The method according to claim 8, further comprising an additional second region, wherein the additional second region is a functional region, and wherein the additional second region is forged into, reforged in, forged to, or formed on the first region.

12. The method according to claim 8, wherein the column is an A-column, a B-column, or a C-column.

13. The method according to claim 8, further comprising the steps of forming a connection node in one piece with the column body and connecting the column body to the motor vehicle body shell structure by the connection node.

* * * * *